United States Patent [19]

Delamater et al.

[11] Patent Number: 5,437,060
[45] Date of Patent: Jul. 25, 1995

[54] APPARATUS AND METHOD FOR REDUCING INTERFERENCE IN A COMMUNICATIONS SYSTEM

[75] Inventors: Jeffrey L. Delamater; David D. Lorang, both of Spokane, Wash.

[73] Assignee: Itronix Corporation, Spokane, Wash.

[21] Appl. No.: 69,894

[22] Filed: Jun. 1, 1993

[51] Int. Cl.⁶ .............................................. H04B 15/00
[52] U.S. Cl. ...................... 455/63; 455/296; 455/310; 375/357
[58] Field of Search ................ 455/63, 50.1, 51.1, 455/67.3, 296, 302, 310, 311, 317, 318; 375/106, 108

[56] References Cited

U.S. PATENT DOCUMENTS

| | | | |
|---|---|---|---|
| 3,388,349 | 6/1968 | Ault | 375/108 |
| 4,507,796 | 3/1985 | Stumfall | 375/106 |
| 4,679,243 | 7/1987 | McGeehan et al. | |
| 4,928,177 | 5/1990 | Martinez | |
| 4,996,684 | 2/1991 | Morley et al. | 375/108 X |

OTHER PUBLICATIONS

"82C85 CMOS Static Clock Controller/Generator" Harris Semiconductor, pp. 4–280 to 4–298, Feb., 1992.
"Introduction to Ceramic Resonators," Murata, pp. 6–13 (no date).
"Definitions and Engineering Design Data," pp. 65–67 (no date).

Primary Examiner—Reinhard J. Eisenzopf
Assistant Examiner—Chi H. Pham

[57] ABSTRACT

A data communications system having a radio modem includes a voltage controlled oscillator for varying the operating frequency of the system clock. Radio interference with the modem is thereby reduced.

19 Claims, 2 Drawing Sheets

APPARATUS AND METHOD FOR REDUCING INTERFERENCE IN A COMMUNICATIONS SYSTEM

BACKGROUND OF THE INVENTION

The present invention relates to communications devices and more particularly to radio modems.

Radio receivers form an integral part of the radio modems used to transfer data between computers. Operating a radio receiver in proximity to a computing device, however, adversely affects the receiver performance. The square-wave clocks used throughout the computer frequently generate harmonic frequencies well into the radio frequency range. These harmonic frequencies are detected as narrow-band noise sources by the receiver and often have amplitudes large enough to completely overwhelm the incoming signal. Thus, these noise sources can prevent incoming data from reaching the receiving computer.

To compensate for this potential interference, systems including radio modems either shield the noise source from the receiver and/or employ data packet error correction and retry schemes to correct data corrupted by the interference. Shielding all of the circuitry in a computer system is complex, costly and adds weight to the device. Data correction methods are capable of correcting only a finite number of errors on either the packet or byte level. If a received packet of data contains too many errors to be corrected, the packet will not be acknowledged to the sending modem. The sending modem will then make another attempt at sending the message. The number of times the transmitting modem will "re-try" the transmission is defined by the network protocol and is also limited to a finite number. Thus, error detection and retry schemes alone are insufficient to ensure accurate exchange of data.

SUMMARY OF THE INVENTION

The present invention varies the frequency of the system clock such that any noise frequencies are present for only a limited period of time. According to one embodiment of the invention, a voltage controlled oscillator is used instead of the oscillating crystal of the typical computer system. The voltage controlled oscillator can thus vary the frequency of the system clock.

According to another embodiment of the present invention, the rate at which the voltage controlled oscillator varies the frequency of the system can also be controlled. In a data system having a packet retry protocol for retransmitting unacknowledged data packets, the oscillator may be controlled such that the system clock remains at a single frequency for less than the time needed to transmit a single data packet. Thus, the probability that two successive packet transmissions will be corrupted by noise is reduced.

According to another embodiment of the present invention, the frequency change rate is controlled to be less than the time needed to send one byte of information. This scheme allows the bit error correction protocols to correct the data without the need to implement the packet retry protocols.

DESCRIPTION OF THE PREFERRED EMBODIMENT

Figure 1:
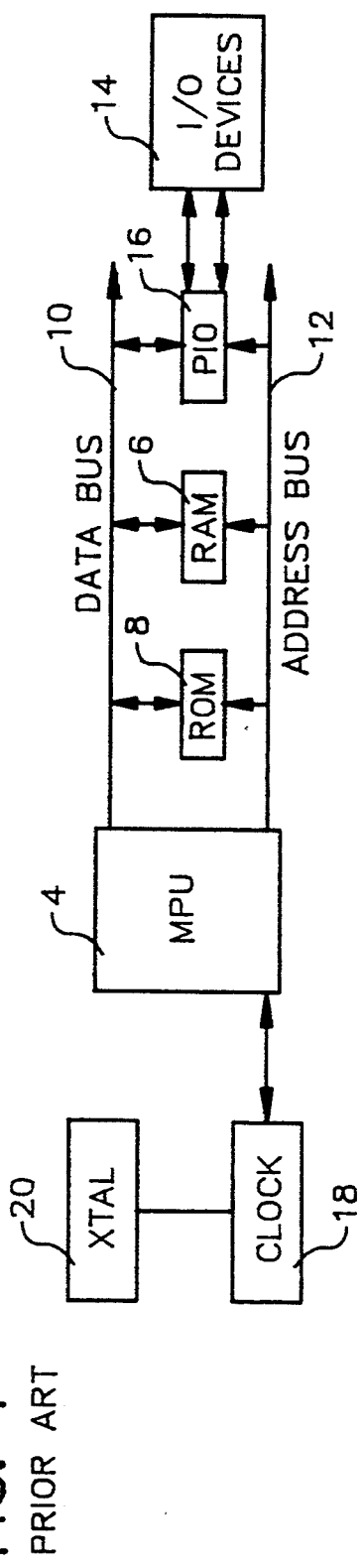
FIG. 1 is a block diagram of a standard computer architecture having crystal driven system clock.

FIG. 1 shows a prior art computer architecture. The computer system of FIG. 1 includes a microprocessor unit 4 coupled to memories 6 and 8 through data and address buses 10 and 12, respectively. An input/output device 14, which may be a radio modem, exchanges data between the computer system and other systems or devices. Modem 14 operates under control of input/output controller 16. The entire system is driven by one or more clocks 18. Clock 18 in turn is driven by an oscillating crystal 20 and therefore operates at a single fixed frequency or derivatives of this frequency. The harmonics of these frequencies can interfere with the integrity of the data exchanges at modem 14.

Figure 2:
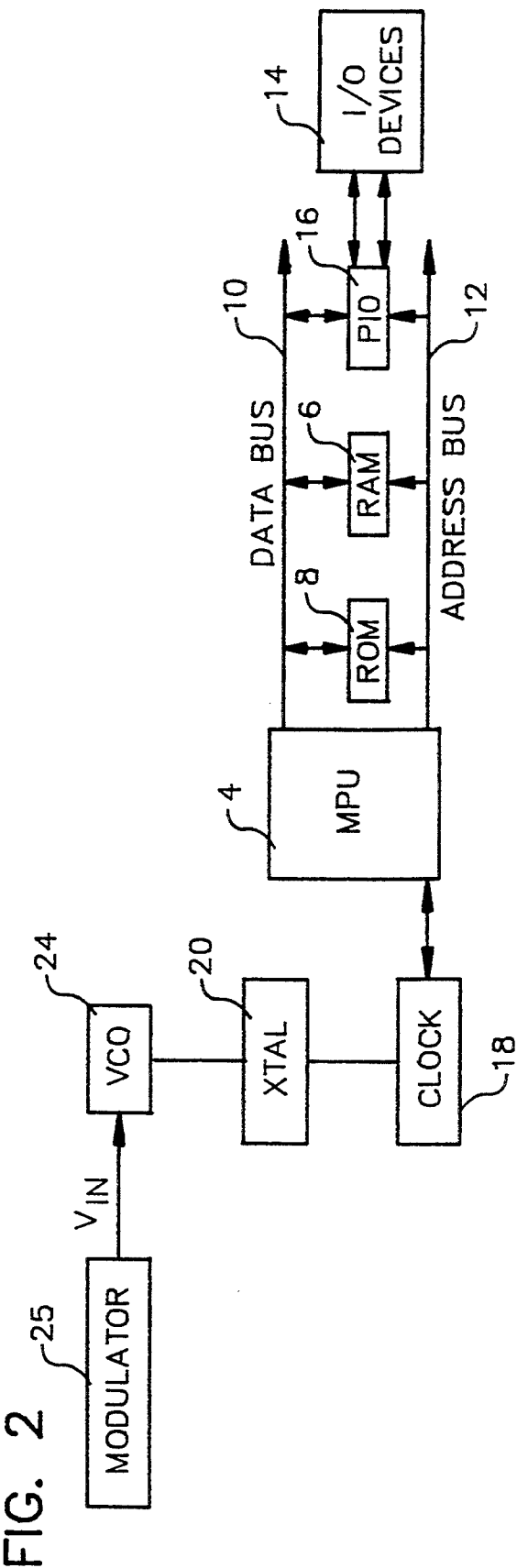
FIG. 2 is a block diagram of a computer architecture including a voltage controlled oscillator according to an embodiment of the present invention.

FIG. 2 shows a computer system constructed according to an embodiment of the present invention. In the system of FIG. 2, clock 18 is driven by a voltage controlled oscillator (VCO) 24. The control input, or $V_{in}$ of VCO 24 is coupled to a modulator signal 25. Modulator 25 may be used to control the VCO output frequency and rate of frequency deviation.

Figure 3:
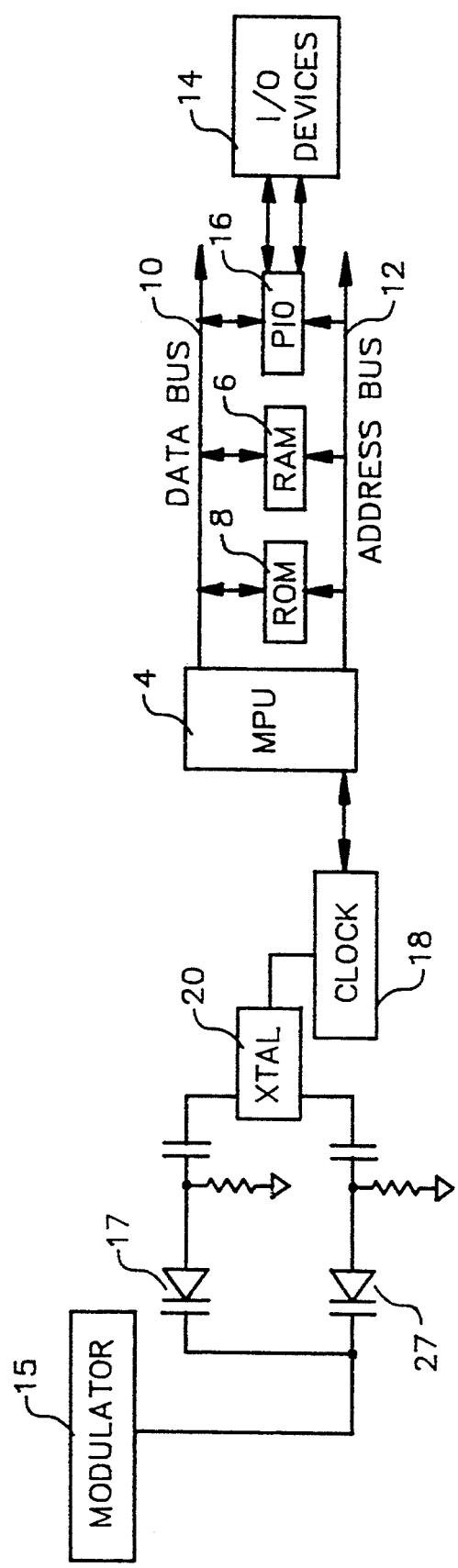
FIG. 3 is a schematic of a voltage controlled oscillator which may be used in connection with an embodiment of the present invention.

FIG. 3 is a schematic showing the construction of the system of FIG. 2 in greater detail. In FIG. 3, VCO 24 includes varactor diodes 27 used as voltage controlled capacitors. As the load capacitance at the crystal 20 (or ceramic resonator) changes, the operating frequency of the oscillator changes. The oscillator circuit of FIG. 2 is readily compatible with existing microcontrollers because many microcontrollers and microprocessor clock generator ICs have several components of the oscillator circuitry (less the crystal and load capacitors) incorporated internally. VCO 24 may be any VCO known to those skilled in the art. For example, VCO 24 may also be constructed from a standard TTL integrated circuit such as a 555 timer or from a CMOS circuit.

Figure 4:
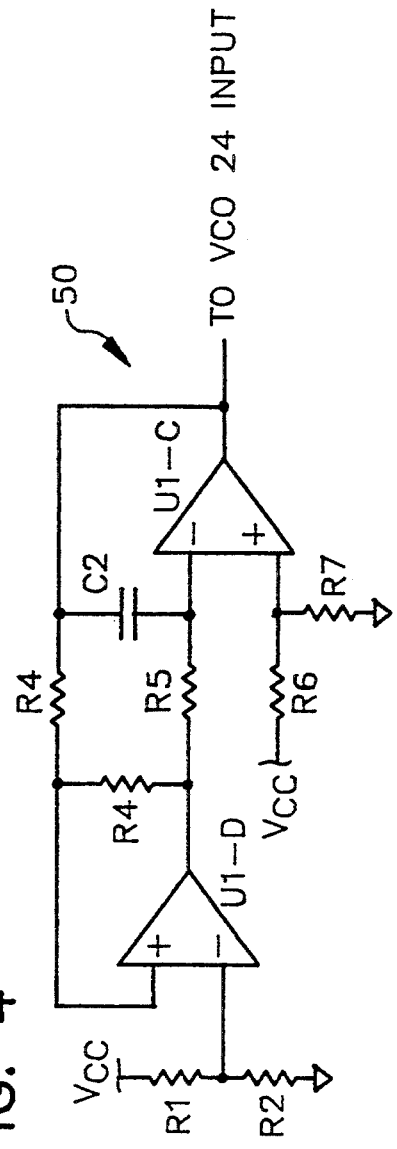
FIG. 4 is a schematic of a triangle wave generator for use in an embodiment of the present invention.

The voltage input to VCO 24 controls the frequency of the clock output. FIG. 4 shows a circuit 50 useful for controlling the voltage input to VCO 24 and hence the frequency output. Circuit 50 may also be used to control the rate of frequency deviation. The circuit of FIG. 4 is a triangle wave generator that runs at approximately 0.005 Hz ($\approx$200 seconds/cycle). The triangle wave thus not only controls the frequency but the rate at which the frequency changes. The output of U1-D and resistors R1–R4 set the threshold voltage levels for the triangle wave output. The divider created by R1 and R2 set the approximate DC bias point of the output voltage. R3 and R4 determine the voltage swing of the output.

The output of U1-D is a square wave (0 to +10.7V). The charge current throughout C2 is determined by the voltage across R5. The voltage across R5 is a constant voltage (and therefore a constant current) because U1-C keeps its input at a constant, for example, 6V and the output of U1-D is one of two constant values. In the embodiment shown, the output of U1-D is either 0V of 10.7V. Therefore, R5 and C2 set the slope of the triangle wave. R6 and R7 set the symmetry of the output. For the triangle wave to be perfectly symmetrical, the voltage divider at R6 and R7 is set at one half U1-D's maximum output voltage. A simple divide by two divider may be used when symmetry is not important. U1-A and U1-B are used as unity gain buffers to isolate the three outputs to the circuitry on the terminal board. Modulator circuits known to those of skill in the art other than a triangle wave buffer on the circuit of FIG. 4 may also be used depending upon the desired VCO operating characteristics.

By replacing the computer's fixed frequency crystal oscillator with VCO 24, the operating frequency of the computer can be changed dynamically. System clock frequency changes are kept small relative to the computer's nominal operating frequency. For example, the modulation can be kept at less than 0.10% of the processor nominal operating frequency. In a preferred embodiment of the present invention, the modulation is kept at 0.08% of the nominal operating frequency. Furthermore, because the modulations are centered at the computer's nominal operating frequency, the effects of any time dependent software average out over time. Thus, operation of the computer is not adversely affected. These frequency changes, however, are large enough to move the harmonic of the operating frequency outside the bandwidth of the radio receiver.

The dynamic system clock therefore interferes with the radio receiver only during a limited period of time when the clock frequency and its associated harmonics pass through the receiver bandwidth. For example, if the radio's operating frequencies are in the 850 MHz band, a 12.5 KHz deviation at 15 MHz nominal operating frequency translates to ±708 KHz at 850 MHz. This deviation bandwidth represents approximately 28 radio channels that the noise frequencies move across.

The chance of the modem receiver failing to receive any one given data packet due to noise decreases as the system clock deviation bandwidth increases. Data packets not acknowledged by the receiving modem may be resent by the transmitting modem. The probability of losing a data packet due to system clock noise can thus be described by the equation below.

$$\text{Probability of Packet Loss} = (\#\text{NoiseFreq}) \times \left( \frac{Rx\ BW}{Dev\ BW} \right)^{\#Tries} \quad \text{(Eq. 1.0)}$$

Where:
Noise Freq: Number of noise frequencies that fall within the range of the deviation bandwidth.
Rx BW: Receive channel Bandwidth
Dev BW: Amount of noise frequency deviation at the receive channel caused by the VCO.
Tries: Number of times the radio modem protocol tries to send a given packet.
For example, given the following:
Radio Receiver Bandwidth=25 KHz
The VCO moves the harmonic of the processor clock between 800.0 MHz and 802.5 MHz
There are 7 noise frequencies in the range 800.0 MHz to 802.5 MHz
Radio data protocol tries to send a particular data packet 3 times before giving up.

Probability of Packet Loss =

-continued $$(7) \times \left( \frac{0.025}{(802.5 - 800.0)} \right)^3 = 7 \times 10^{-6}$$

The probability of losing a data packet can be further influenced by controlling the rate at which the noise frequency deviation occurs. The triangle wave generator of FIG. 4, for example, may be used for this purpose. Clock frequency deviations are timed to keep the noise frequency within the receiver bandwidth for an amount of time equal to the time necessary to transmit a single data packet. This technique reduces the probability that the noise frequency will re-enter the receiver bandwidth during retransmission of an unacknowledged data packet.

In the example given above, seven noise frequencies exist. Suppose further that the transmitting modem transmits a data packet every 125 microseconds. The input voltage to VCO 24 can therefore be controlled by circuit 50 such that the processor clock remains on any one frequency for less than 125 microseconds. This procedure reduces the likelihood that a retransmitted packet will also fail to be received because of interference caused when the clock transitions through one of the seven noise frequencies.

Another approach for timing the frequency transitions of the system clock makes advantageous use of the radio modem's bit error correction algorithm. In this approach, the rate of noise frequency deviation is controlled to where the noise frequency remains in the receive channel bandwidth for only one byte of transmission time. If this rate corresponds to the amount of data that the error correction protocol can correct in a single packet, the packet re-try is not required.

Preferred embodiments of the invention have now been described. Variations and modifications will be readily apparent to those of skill in the art. For example, for purposes of describing the invention, a computer system with CPU was described herein. The present invention can be used for any circuitry with a clock signal that causes a reduction in the system's radio receiver sensitivity. Examples include display clocks, real-time clocks, discrete logic circuitry, address decode/encode logic, programmable array logic, digital signal processors, and gate array logic. For this reason, the invention should be construed in light of the appended claims.

What is claimed is:

1. In a transmission system having a system clock and a radio modem with a receiver bandwidth, said radio modem for transmitting and receiving data in data packets, each packet defining a first time period, said system generating noise at a noise frequency which depends on the frequency of the system clock, a method for minimizing radio interference comprising the steps of:
varying the frequency of the system clock at a given rate throughout a range of frequencies centered around a nominal frequency of the system clock wherein said noise frequency is maintained within said receiver bandwidth for an amount of time substantially equal to said first time period.

2. The method of claim 1 wherein the step of varying the frequency further comprises the step of varying the frequency using a voltage controlled oscillator.

3. A method, as claimed in claim 1, wherein the step of varying the frequency of the system clock includes varying the frequency by an amount equal to no more than about 0.1% of said nominal frequency of the system clock.

4. A method, as claimed in claim 1, wherein the step of varying the frequency of the system clock comprises varying the frequency by no more than about 12.5 KHz.

5. A method, as claimed in claim 1, wherein said system clock includes circuitry for coupling a crystal oscillator and wherein said step of varying the frequency includes coupling circuitry to said crystal oscillator for varying the frequency output by the crystal oscillator.

6. A method, as claimed in claim 1, wherein said system clock includes a ceramic resonator.

7. In a transmission system having a system clock and a radio modem with a receiver bandwidth, said radio modem for transmitting and receiving data in data packets, each packet defining a first time period, said system generating noise at a noise frequency which depends on the frequency of the system clock, a method for minimizing radio interference comprising the steps of:
varying the frequency of the system clock throughout a range of frequencies centered around a nominal frequency of the system clock; and
controlling a rate of frequency deviation of the system clock wherein the system clock remains on any one given frequency within said range of frequencies for less than a data packet transmission time of the transmission system and wherein said noise frequency is maintained within said receiver bandwidth for an amount of time substantially equal to said first time period.

8. The method of claim 7 wherein the step of varying the frequency further comprises the step of varying the frequency using a voltage controlled oscillator.

9. The method of claim 8 wherein the step of varying the frequency further comprises the steps of:
using a triangle wave generator coupled to said voltage controlled oscillator to control a voltage input to said voltage controlled oscillator.

10. In a transmission system having a system clock and a radio modem with a receiver bandwidth, said radio modem for transmitting and receiving data in data packets, each packet defining a first time period, said system generating noise at a noise frequency which depends on the frequency of the system clock, a method for minimizing radio interference comprising the steps of:
varying the frequency of the system clock throughout a range of frequencies centered around a nominal frequency of the system clock; and
controlling a rate of frequency deviation of the system clock wherein the system clock remains on any one given frequency within said range of frequencies for less than a byte transmission time of the transmission system and wherein said noise frequency is maintained within said receiver bandwidth for an amount of time substantially equal to said first time period.

11. The method of claim 10 wherein the step of varying the frequency further comprises the step of varying the frequency using a voltage controlled oscillator.

12. The method of claim 11 wherein the step of varying the frequency further comprises the steps of:
using a triangle wave generator coupled to said voltage controlled oscillator to control a voltage input to said voltage controlled oscillator.

13. In a transmission system having a system clock and a radio modem with a receiver bandwidth, said radio modem for transmitting and receiving data in data packets, each packet defining a first time period, said system generating noise at a noise frequency which depends on the frequency of the system clock, an apparatus for reducing radio interference comprising:
a voltage controlled oscillator coupled to said system clock for varying a frequency of said system clock within a range of frequencies centered around a nominal frequency of said system clock wherein said noise frequency is maintained within said receiver bandwidth for an amount of time substantially equal to said first time period.

14. The apparatus of claim 13 further comprising a means for controlling a voltage input to said voltage controlled oscillator.

15. The apparatus of claim 14 wherein said means for controlling comprises a triangle wave generator.

16. A data communication system comprising:
a processing system having a system clock;
a radio receiver coupled to said processing system for receiving at least one of data or instructions to be processed by said processing system with a receiver bandwidth, said radio modem for transmitting and receiving data in data packets, each packet defining a first time period, said system generating noise at a noise frequency which depends on the frequency of the system clock; and
means coupled to said processing system for varying an operating frequency of said processing system within a range of frequencies centered around a nominal operating frequency of said processing system wherein said noise frequency is maintained within said receiver bandwidth for an amount of time substantially equal to said first time period.

17. The data communication system of claim 16 wherein said means for varying comprises a voltage controlled oscillator.

18. The data communication system of claim 16 further comprising:
means, coupled to said means for varying, for controlling a rate at which said frequencies are varied.

19. The data communications system of claim 18 wherein:
said means for varying comprises a voltage controlled oscillator; and
said means for controlling comprises a triangle wave generator coupled to a voltage control input of said voltage controlled oscillator.

* * * * *